(12) United States Patent  (10) Patent No.: US 8,223,279 B2
Zheng et al.  (45) Date of Patent: Jul. 17, 2012

(54) THREE-DIMENSIONAL (3D) DISPLAY SYSTEM AND METHOD

(75) Inventors: Huabing Zheng, Shenzhen (CN); Jing Zhang, Shenzhen (CN); Xiaowei Lu, Shenzhen (CN)

(73) Assignee: Shenzhen Super Perfect Optics Limited, Shenzhen (CN)

( * ) Notice: Subject to any disclaimer, the term of this patent is extended or adjusted under 35 U.S.C. 154(b) by 157 days.

(21) Appl. No.: 12/906,075

(22) Filed: Oct. 16, 2010

(65) Prior Publication Data

US 2011/0175906 A1 Jul. 21, 2011

Related U.S. Application Data

(63) Continuation of application No. PCT/CN2010/070291, filed on Jan. 20, 2010.

(30) Foreign Application Priority Data

Jul. 10, 2010 (CN) .......................... 2010 1 0235020

(51) Int. Cl.
 *G02F 1/1335* (2006.01)
 *G02F 1/13* (2006.01)
(52) U.S. Cl. ........................... 349/15; 349/188; 349/200
(58) Field of Classification Search .................... 349/15, 349/188, 200
 See application file for complete search history.

(56) References Cited

U.S. PATENT DOCUMENTS

| | | | |
|---|---|---|---|
| 4,385,805 A | 5/1983 | Channin | |
| 5,493,427 A * | 2/1996 | Nomura et al. | 349/5 |
| 6,665,108 B2 | 12/2003 | Brown et al. | |
| 6,999,071 B2 | 2/2006 | Balogh | |
| 7,357,510 B2 | 4/2008 | Kim et al. | |
| 7,375,784 B2 | 5/2008 | Smith et al. | |
| 7,486,341 B2 | 2/2009 | Hong et al. | |
| 7,623,188 B2 | 11/2009 | Hamagishi | |
| 7,697,109 B2 * | 4/2010 | Yun et al. | 349/200 |

(Continued)

FOREIGN PATENT DOCUMENTS

CN   20071012896.4   11/2008

(Continued)

OTHER PUBLICATIONS

Search Report issued from Chinese Patent Office on May 4, 2012 in Chinese Patent Application No. 201080003511.9.

(Continued)

*Primary Examiner* — Mike Qi

(74) *Attorney, Agent, or Firm* — Anova Law Group, PLLC; Wenye Tan

(57) ABSTRACT

A three-dimensional (3D) display system is provided for displaying a 3D image. The 3D image includes at least a first image and a second image, with a parallax between the first image and the second image. The 3D display system includes a display device, and a liquid crystal lens array. Further, the display device is configured to display at least two combined images of the 3D image in a single display period, and each of the two combined images includes a part of the first image and a part of the second image. The liquid crystal lens array has a plurality of lens units configured to separate the part of the first image and the part of the second image in each of the two combined images into predetermined viewing directions, respectively, such that a complete first image and a complete second image are displayed without losing resolution.

20 Claims, 13 Drawing Sheets

U.S. PATENT DOCUMENTS

| | | |
|---|---|---|
| 7,701,637 B2 | 4/2010 | Redert |
| 7,710,648 B2 * | 5/2010 | Chestak et al. .............. 359/465 |
| 7,714,946 B2 | 5/2010 | Hong et al. |
| 2002/0181126 A1 | 12/2002 | Nishioka |
| 2004/0021802 A1 | 2/2004 | Yoshino et al. |
| 2004/0179280 A1 | 9/2004 | Nishioka |
| 2004/0240777 A1 | 12/2004 | Woodgate et al. |
| 2005/0248705 A1 | 11/2005 | Smith et al. |
| 2006/0139751 A1 * | 6/2006 | Cha et al. ..................... 359/465 |
| 2006/0273919 A1 | 12/2006 | Sato et al. |
| 2007/0115230 A1 | 5/2007 | Tajiri et al. |
| 2007/0195410 A1 | 8/2007 | Yun et al. |
| 2007/0296911 A1 | 12/2007 | Hong |
| 2008/0129899 A1 | 6/2008 | Sharp |
| 2008/0129900 A1 | 6/2008 | Sharp |
| 2008/0204663 A1 | 8/2008 | Balogh |
| 2008/0252556 A1 | 10/2008 | Tseng et al. |
| 2008/0252720 A1 | 10/2008 | Kim et al. |
| 2008/0278639 A1 | 11/2008 | Hamagishi |
| 2008/0278808 A1 | 11/2008 | Redert |
| 2009/0015737 A1 | 1/2009 | Jung et al. |
| 2009/0015738 A1 | 1/2009 | Hong et al. |
| 2009/0015739 A1 | 1/2009 | Shin et al. |
| 2009/0015918 A1 | 1/2009 | Morozumi et al. |
| 2009/0033812 A1 | 2/2009 | Ijzerman et al. |
| 2009/0109154 A1 | 4/2009 | Hong et al. |
| 2009/0122210 A1 | 5/2009 | Im |
| 2009/0147160 A1 | 6/2009 | Roosendaal et al. |
| 2009/0153653 A1 | 6/2009 | Lee et al. |
| 2009/0153754 A1 | 6/2009 | Jung |
| 2009/0190048 A1 | 7/2009 | Hong et al. |
| 2009/0190049 A1 | 7/2009 | Hong et al. |
| 2009/0315883 A1 | 12/2009 | King |
| 2010/0149444 A1 | 6/2010 | Hikmet et al. |

FOREIGN PATENT DOCUMENTS

| | | |
|---|---|---|
| CN | 200810127998.6 | 1/2009 |
| CN | 2008101009490.7 | 1/2009 |

OTHER PUBLICATIONS

First Examination Opinion issued from Chinese Patent Office on May 21, 2012 in Chinese Patent Application No. 201080003511.9.

* cited by examiner

THREE-DIMENSIONAL (3D) DISPLAY SYSTEM AND METHOD

CROSS-REFERENCES TO RELATED APPLICATIONS

This application claims the priorities of PCT patent application no. PCT/CN2010/070291 filed on Jan. 20, 2010, and Chinese patent application no. 201010235020.9 filed on Jul. 10, 2010, the entire contents of all of which are incorporated herein by reference.

FIELD OF THE INVENTION

The present invention relates to three-dimensional (3D) display technologies and, more particularly, to the methods and systems for high-resolution 3D display.

BACKGROUND

Most display devices in the current market are flat screen displays. With the development of new technologies, three-dimensional (3D) display devices start entering the market as well. 3D display technologies are often based on the notion of parallax, the small disparity between observations of a viewer's left eye and right eye, for the viewer to perceive 3D depth. Thus, by providing two separate images with a certain parallax between them for the viewer's left eye and right eye, respectively, the viewer can perceive a 3D image. Further, some 3D technologies may require the viewer to wear certain special auxiliary equipment in order to view the 3D image, such as wearing a 3D helmet, a 3D polarizing glasses or shutter glasses to view the 3D image. Now, there are also autostereoscopic 3D display devices that do not require the viewer to wear any auxiliary equipment. Such autostereoscopic 3D display devices often comprise a normal two-dimensional (2D) flat screen display (a liquid crystal display (LCD), a plasma display panel (PDP) display, a field emission display (FED), and an organic light emitting diode (OLED) display, etc.) coupled with a grating device.

The grating device can be a slit grating type or a lenticular grating type, and thus the corresponding 3D display device can be a slit grating 3D display or a lenticular lens 3D display. However, as limited by materials used to make conventional grating devices, system parameters such as grating position and grating period of the conventional grating devices are fixed and cannot be varied.

Certain technologies have been developed to address such problems. For example, U.S. Pat. No. 5,493,427 issued to Nomura et al. on Feb. 20, 1996, discloses a 3D display device with a variable lens. The variable lens is formed by an array of cylindrical lenses and optical characteristics of each of the cylindrical lenses can be changed by applying a voltage to change at least one surface shape of the transparent substance of the cylindrical lenses.

Further, the above disclosed variable lens 3D display device also separates pixels of the display screen into two parts, left pixels for generating images for the viewer's left eye and right pixels for generating images for the viewer's right eye. However, because the left pixels and the right pixels respectively use one half of the total pixels of the display screen, the 3D display resolution is also reduced by 50 percent and thus may impact display quality.

The disclosed methods and systems are directed to solve one or more problems set forth above and other problems.

BRIEF SUMMARY OF THE DISCLOSURE

One aspect of the present disclosure includes a three-dimensional (3D) display system for displaying a 3D image. The 3D image includes at least a first image and a second image, with a parallax between the first image and the second image. The 3D display system includes a display device, and a liquid crystal lens array. Further, the display device is configured to display at least two combined images of the 3D image in a single display period, and each of the two combined images includes a part of the first image and a part of the second image. The liquid crystal lens array has a plurality of lens units configured to separate the part of the first image and the part of the second image in each of the two combined images into predetermined viewing directions, respectively, such that a complete first image and a complete second image are displayed without losing resolution.

Another aspect of the present disclosure includes a method for a 3D display system. The method includes providing a 3D image including at least a first image and a second image, with a parallax between the first image and the second image. The method also includes displaying at least two combined images of the 3D image in a single display period, and each of the two combined images includes a part of the first image and a part of the second image. Further, the method includes applying a plurality of driving voltages to a liquid crystal lens array including a plurality of lens units to separate the part of the first image and the part of the second image in each of the two combined images into predetermined viewing directions, respectively, such that a complete first image and a complete second image are displayed without losing resolution.

Another aspect of the present disclosure includes a method for a 3D display system for displaying a 3D image. The 3D image includes at least a first image and a second image, with a parallax between the first image and the second image. The 3D display system includes a display device, a plurality of driving voltages, and a slit grating device. The display device is configured to display at least two combined images of the 3D image in a single display period, and each of the two combined images includes a part of the first image and a part of the second image. Further, the slit grating device is driven by the plurality of driving voltages. The slit grating device is configured to alternately form a first slit grating and a second slit grating to separate the part of the first image and the part of the second image in each of the two combined images into different viewing directions, respectively, such that a complete first image and a complete second image are displayed without losing resolution.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1A:
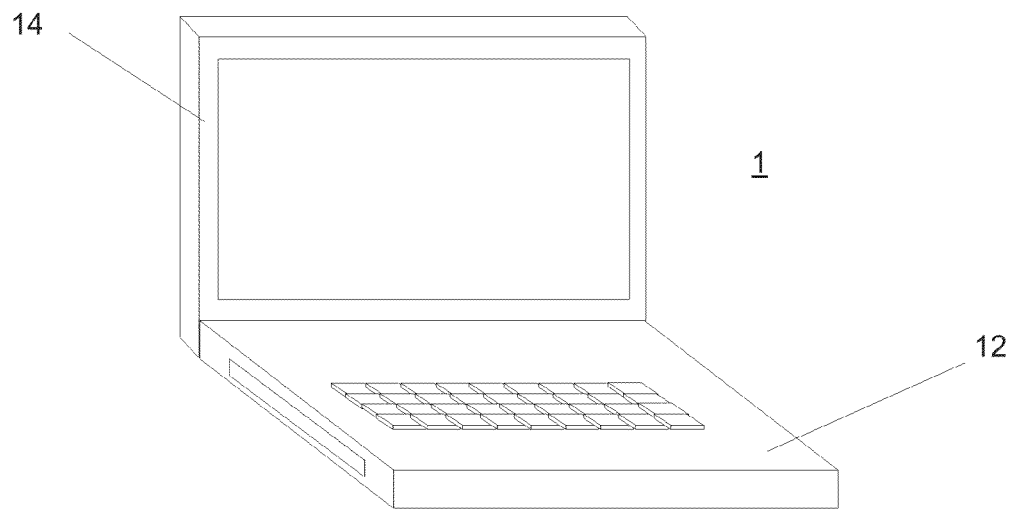
FIG. 1A shows an exemplary environment incorporating certain aspects of the invention.

FIG. 1A shows an exemplary environment incorporating certain aspects of the invention. As shown in FIG. 1A, a three-dimensional (3D) display system 1 may include a base 12 and a 3D display device 14. 3D display system 1 may include any appropriate device that capable of processing and displaying 3D images, such as a computer, a television set, a smart phone, or a consumer electronic device. Although 3D display system 1 is shown as a notebook computer, any device with computing power may be included.

Base 12 may include any appropriate structures and components to support operations of 3D display system 1. For example, base 12 may include a controller to control operation of 3D display device 14. The controller may include a processor such as a graphic processing unit (GPU), general purpose microprocessor, digital signal processor (DSP) or microcontroller, and application specific integrated circuit (ASIC). The controller may also include other devices such as memory devices, communication devices, input/output devices, driving circuitry, and storage devices, etc. During operation, the controller may receive image data from any appropriate data source, process the image data, and control 3D display device 14 to display 3D images. The controller may also execute sequences of computer program instructions to perform various processes associated with 3D display system 1.

Figure 1B:
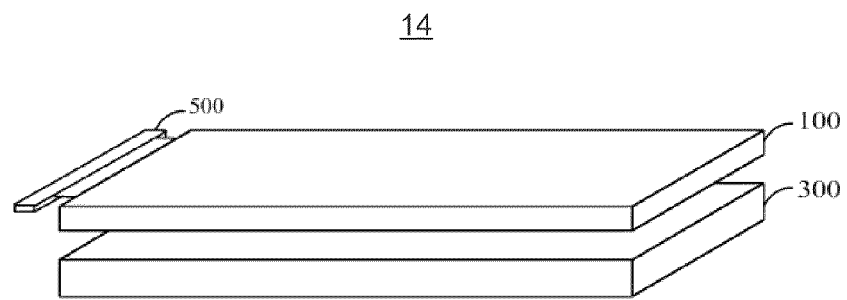
FIG. 1B illustrates a block diagram of a 3D display device consistent with the disclosed embodiments.

FIG. 1B illustrates a block diagram of a 3D display device 14 consistent with the disclosed embodiments. As shown in FIG. 1B, 3D display device 14 may include a liquid crystal lens array 100, a driving voltage 500, and a display module 300. Display module 300 may display two-dimensional (2D) images and provide the 2D images to liquid crystal lens array 100. Display module 300 may include any appropriate type of display screen based on plasma display panel (PDP) display, field emission display (FED), cathode ray tube (CRT) display, liquid crystal display (LCD), organic light emitting diode (OLED) display, or other types of displays. Other display types may also be used. Further, driving voltage 500 may include any circuitry and voltage source(s) to drive components of 3D display device 14, such as liquid crystal lens array 100.

Figure 2:
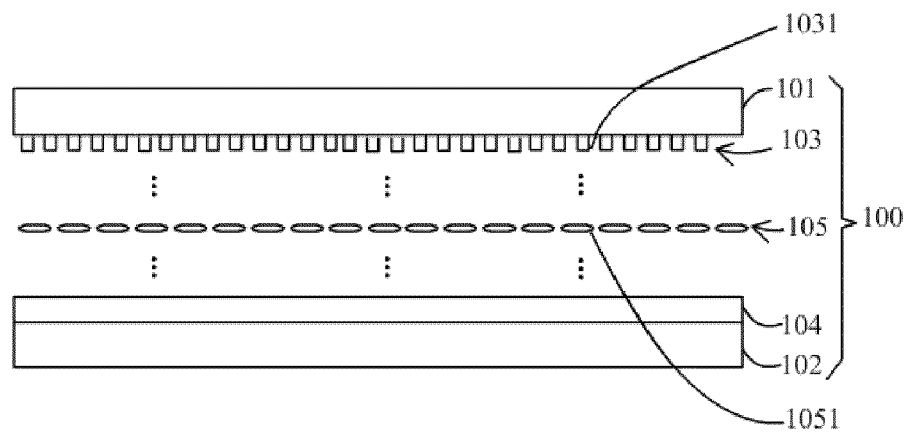
FIG. 2 illustrates an exemplary liquid crystal lens array consistent with the disclosed embodiments.

FIG. 2 illustrates an exemplary liquid crystal lens array consistent with the disclosed embodiments. As shown in FIG. 2, liquid crystal lens array 100 may include a first substrate 101, a second substrate 102, a first electrode layer 103, a second electrode layer 104, and a liquid crystal layer 105. Other components may also be included.

First substrate 101 and/or second substrate 102 may be configured correspondingly and may be in a plate shape made from transparent materials such as glass, silicon, or synthetic resin. First electrode layer 103 may be attached or built on the inside surface of first substrate 101 facing second substrate 102. First electrode layer 103 may include a plurality of strip-shaped electrodes 1031, and each of the plurality of electrodes 1031 may be arranged in parallel with a certain distance between each other.

Second electrode layer 104 may be attached or built on the inside surface of second substrate 102 facing first substrate 101, and corresponding to first electrode layer 103. Second electrode layer 104 may include a single plate electrode or a plurality of electrodes similar to first electrode layer 103. Further, first electrode layer 103 and second electrode layer 104 may be made of transparent materials, such as Indium Tin Oxides (ITO), Indium Zinc Oxide (IZO), or a-Indium Tin Oxides (a-ITO).

Further, liquid crystal layer 105 may be placed between first electrode layer 103 and second electrode layer 104, and may be sealed between first electrode layer 103 and second electrode layer 104. For example, UV (Ultraviolet Rays) light curing adhesive may be used to seal the edges of the space between first electrode layer 103 and second electrode layer 104 such that a sealed space may be formed between first electrode layer 103 and second electrode layer 104. The sealed space may then be used to contain liquid crystal layer 105. Further, liquid crystal layer 105 may contain many liquid crystal molecules 1051. A liquid crystal molecule 1051 may be in a rod shape and have a long axis along the rod direction. Under the effect of an electric field between first electrode layer 103 and second electrode layer 104, liquid crystal molecules 1051 may change directions or orientations, e.g., changes the direction of the long axis. For illustrative purposes and without limiting, a positive dielectric anisotropic liquid crystal is used. Other types of liquid crystal, however, may also be used.

Figure 3:
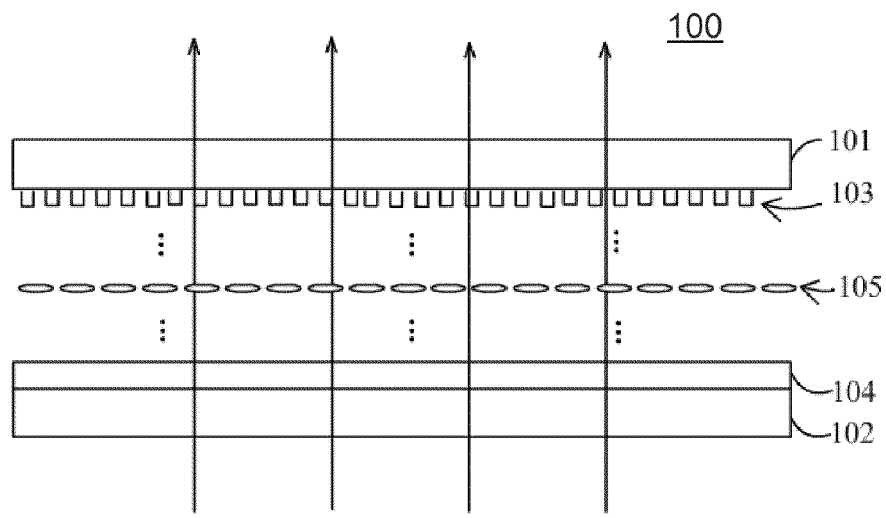
FIG. 3 illustrates an exemplary liquid crystal lens array for 2D display consistent with the disclosed embodiments.

FIG. 3 shows an exemplary liquid crystal lens array for 2D display. As shown in FIG. 3, a zero voltage difference is maintained between first electrode layer 103 and second electrode layer 104. The long axis of liquid crystal molecules 1051 of liquid crystal layer 105 is parallel to first substrate 101 and second substrate 102. When lights enter liquid crystal lens array 100 through second substrate 102 in a perpendicular direction, because a polarizer placed outside liquid crystal lens array 100 can be configured to a polarization direction in parallel with the long axis direction of liquid crystal molecules 1051. The lights then pass, in sequence, second substrate 102, second electrode layer 104, liquid crystal layer 105, first electrode layer 103, and first substrate 101 to reach a viewer in front of liquid crystal lens array 100. Thus the viewer can see 2D images.

Figure 4:
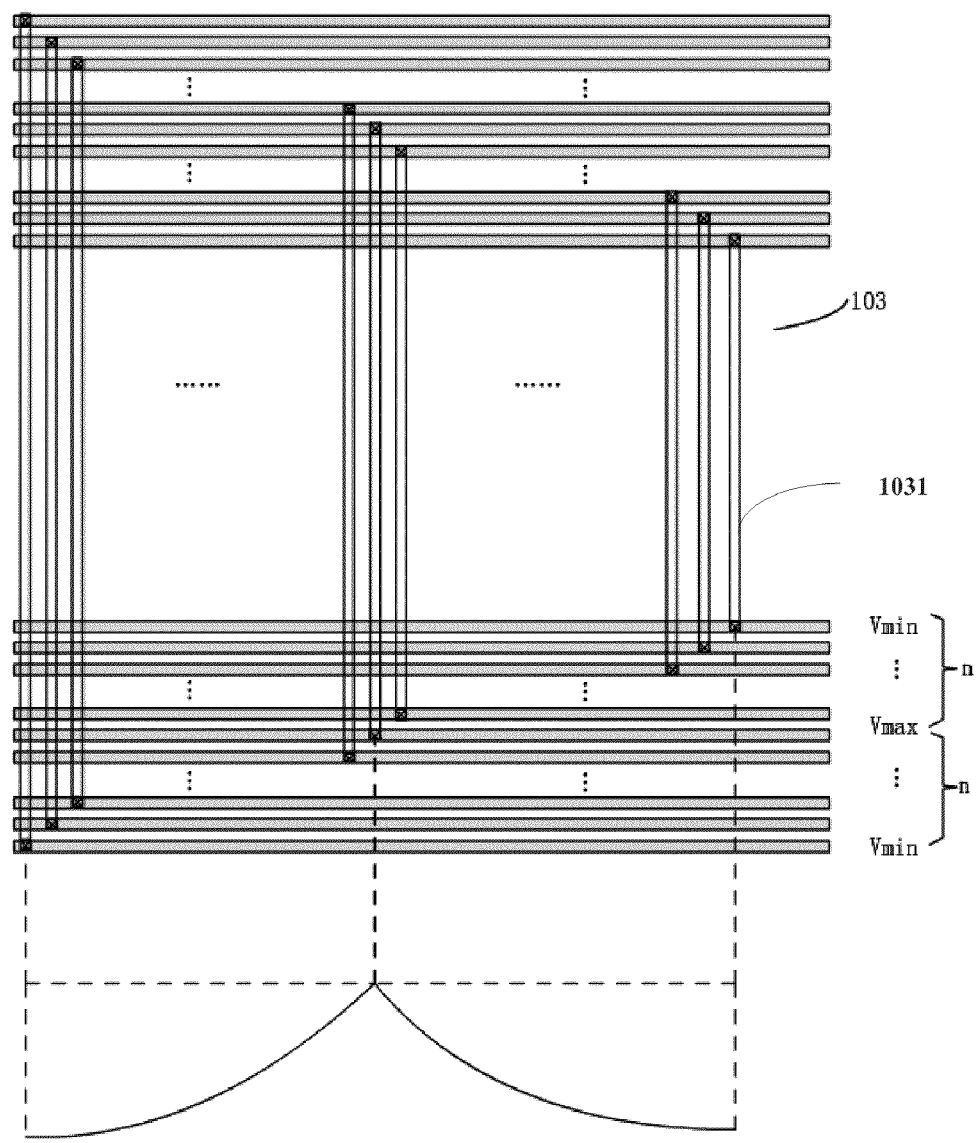
FIG. 4 illustrates an exemplary liquid crystal lens array for 3D display consistent with the disclosed embodiments.

FIG. 4 shows an exemplary liquid crystal lens array for 3D display. As shown in FIG. 4, to obtain 3D image display, driving voltage 500 may be controlled to provide a fixed voltage on second electrode layer 104, and to provide each strip electrode 1031 of first electrode layer 103 with un-identical voltages, while providing neighboring strip electrodes 1031 with different voltages. For example, among the plurality of strip-shaped electrodes 1031 arranged horizontally in parallel, the first electrode (i.e., the most left electrode) may be applied with a smallest voltage, as Vmin, and the n-th electrode is applied with a biggest voltage, as Vmax. From the first electrode to the n-th electrode, voltages applied to a total n number of electrodes increase gradually. Further, starting from the n-th electrode, the voltages applied to the next n number of electrodes decrease gradually until the voltage becomes Vmin again on the 2n-th electrode. Thus, with the n-th electrode as an axis, the voltages applied to electrodes at each side of n-th electrode are symmetric. Because liquid crystal molecules 1051 rotate in different angles under different voltages, liquid crystal molecules 1051 at two far sides of the n-th electrode may rotate in smaller angles than those close to the n-th electrode. Further, because different degrees of rotation give liquid crystal molecules 1051 different refractive indices, liquid crystal molecules 1051 between the total 2n number of electrodes centered at the n-th electrode may form a lens structure (or a lens unit). Similarly, liquid crystal lens array 100 may include many lens structures with the same configurations to form a continuous lens array.

Figure 5:
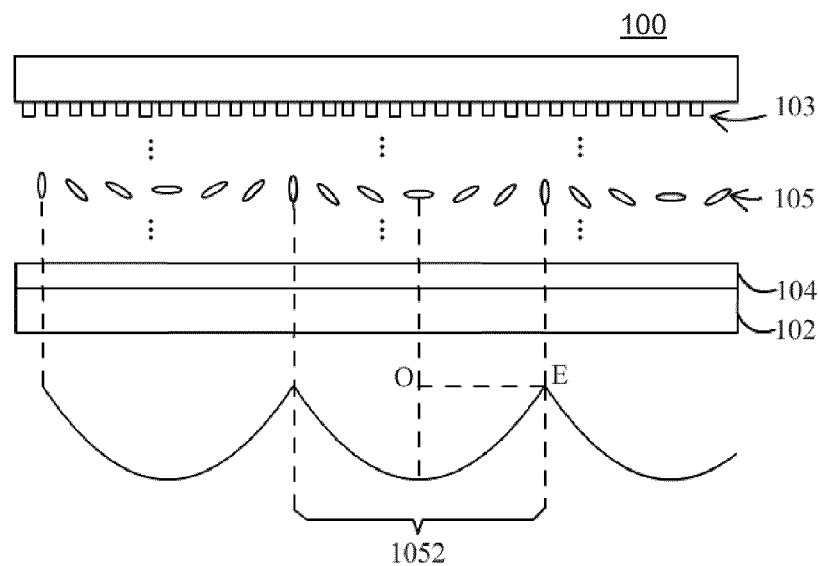
FIG. 5 illustrates an exemplary liquid crystal lens array consistent with the disclosed embodiments.

FIG. 5 shows an exemplary liquid crystal lens array consistent with the disclosed embodiments. As shown in FIG. 5, each lens structure or lens unit 1052 of liquid crystal lens array 100 may have a center line O, and an edge or an edge line E. In each lens unit 1052, the portion between center line O and edge line E corresponding to n number of strip electrodes 1031 of first electrode layer 103, as explained above. Further, voltages applied to the n number of strip electrodes 1031 may be gradually changing value along the O-E direction, from the smallest value at center line O (i.e., Vmin) to the largest value at edge line E (i.e., Vmax). The minimum voltage Vmin is usually greater than or equal to a threshold voltage V for making liquid crystal molecules 1051 rotate the long axis, and V is represented as:

$$V = \pi \sqrt{\frac{K_1}{\Delta \varepsilon \varepsilon_0}}$$

where $\Delta \varepsilon$ is a liquid crystal dielectric anisotropy constant, $K_1$ as the liquid crystal layer elasticity, $\varepsilon_0$ is permittivity of free space. Further, voltages may be applied on the n number of strip electrodes 1031 on both sides (from center line O to the other edge of lens unit 1052) symmetrically along center line O.

Figure 6:
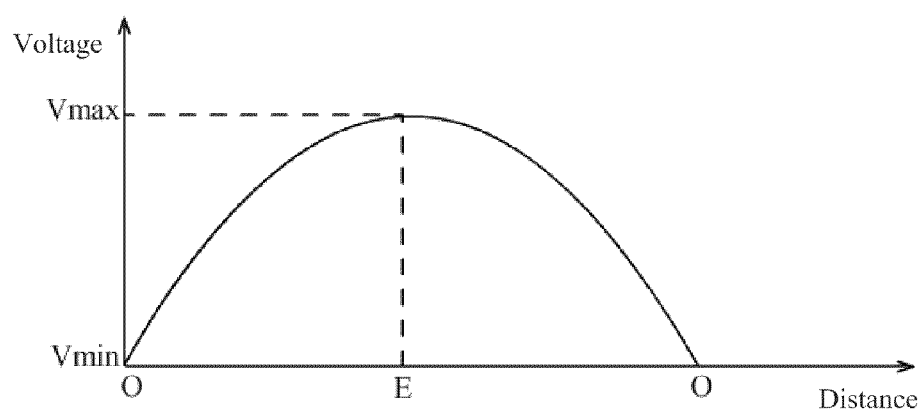
FIG. 6 illustrates an exemplary pattern for increasing the various voltages consistent with the disclosed embodiments.

In addition, when applying various voltages to the electrodes from center line O to edge line E, the voltages may be increased gradually in equal increments for each strip electrode. Or the voltages may be increased in certain different patterns. For example, the voltages may be increased in large increments first, and then be increased in small increments, or the voltages may be increased in small increments first, and then be increased in large increments. FIG. 6 shows an exemplary pattern for increasing the various voltages. As shown in FIG. 6, the x-axis represents distance, from center line O to edge line E of a lens unit and from edge line E back to center line O of a neighboring lens unit. The y-axis represents voltages applied, in a projection line pattern.

Figure 7:
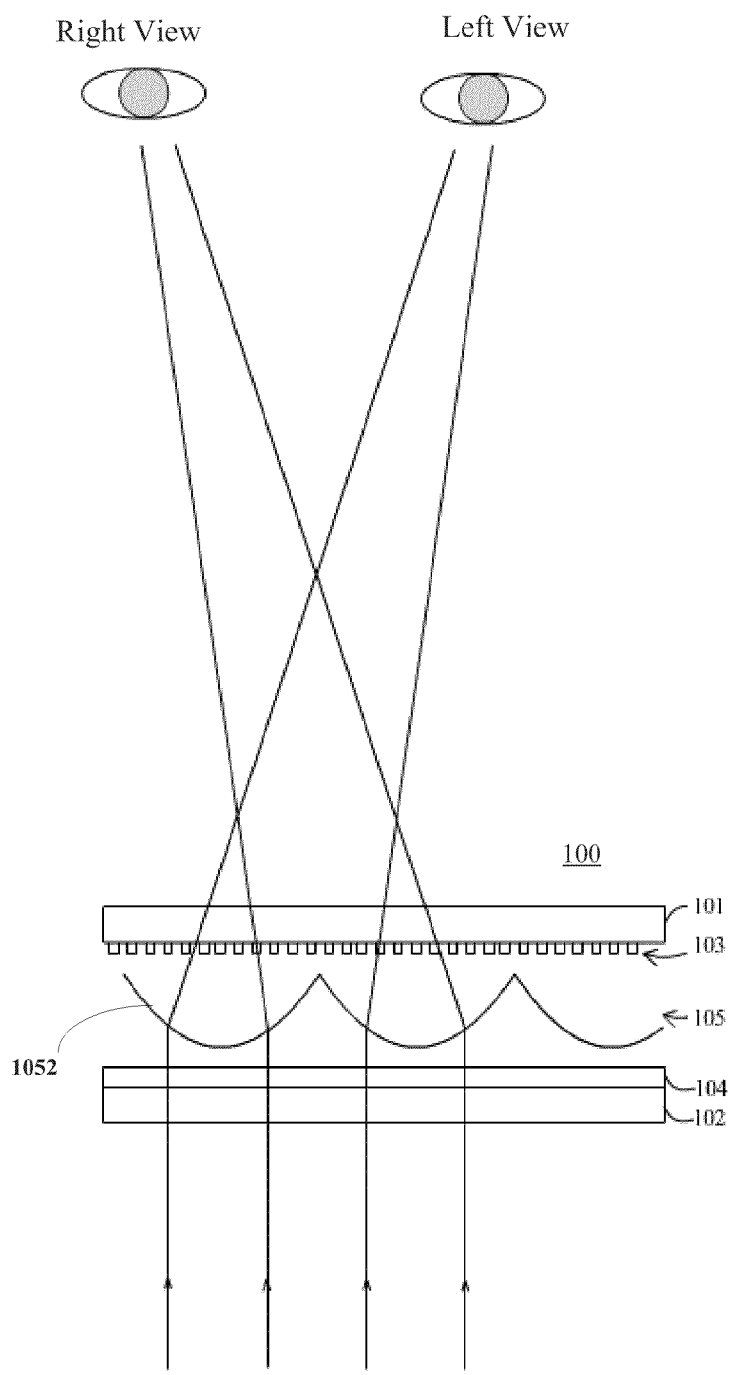
FIG. 7 illustrates an exemplary liquid crystal lens array for 3D display consistent with the disclosed embodiments.

FIG. 7 shows an exemplary liquid crystal lens array 100 for 3D display consistent with the disclosed embodiments. As shown in FIG. 7, lights from a 3D image enters liquid crystal lens array 100 via second substrate 102 in a perpendicular direction. The lights go through transparent second substrate 102, transparent second electrode layer 104, and reach any of lens unit 1052.

For any lens unit 1052, from center line O to edge line E, liquid crystal molecules 1051 may have different degrees of rotation of their long axis, and thus may have different refractive indices. Therefore, each lens unit 1052 may be equivalent to a cylindrical lens, and liquid crystal cylindrical lens array 100 may be equivalent to a lenticular lens screen and may change the paths of the lights like a lenticular lens screen.

When the lights are from the 3D image that includes an image to be viewed by a viewer's left eye (the left image) and an image to be viewed by the viewer's right eye (the right image), with a parallax between the left image and the right image, lights from the left image go through lens units 1052 and are guided into the direction of a left view. Similarly, lights from the right image go through lens units 1052 and are guided to the direction of a right view. When the distance between the left view and the right view (at a viewing distance) is equal to the distance between the viewer's left eye and right eye, the viewer will see the 3D image.

Further, to achieve a high-resolution when displaying 3D images, voltage values applied to strip electrodes 1031 of first electrode layer 103 may periodically shift along the direction from center line O to edge line E. This periodical shift of voltage may make a lens unit 1052 in liquid crystal lens array 100 have mobility. That is, the series of voltages making lens unit 1052 may be shifted continuously in the direction from center line O to edge line E, which is equivalent to lens unit 1052 moving in the direction from center line O to edge line E periodically. This lens unit mobility may be used to enhance resolution of 3D display.

Figure 8:
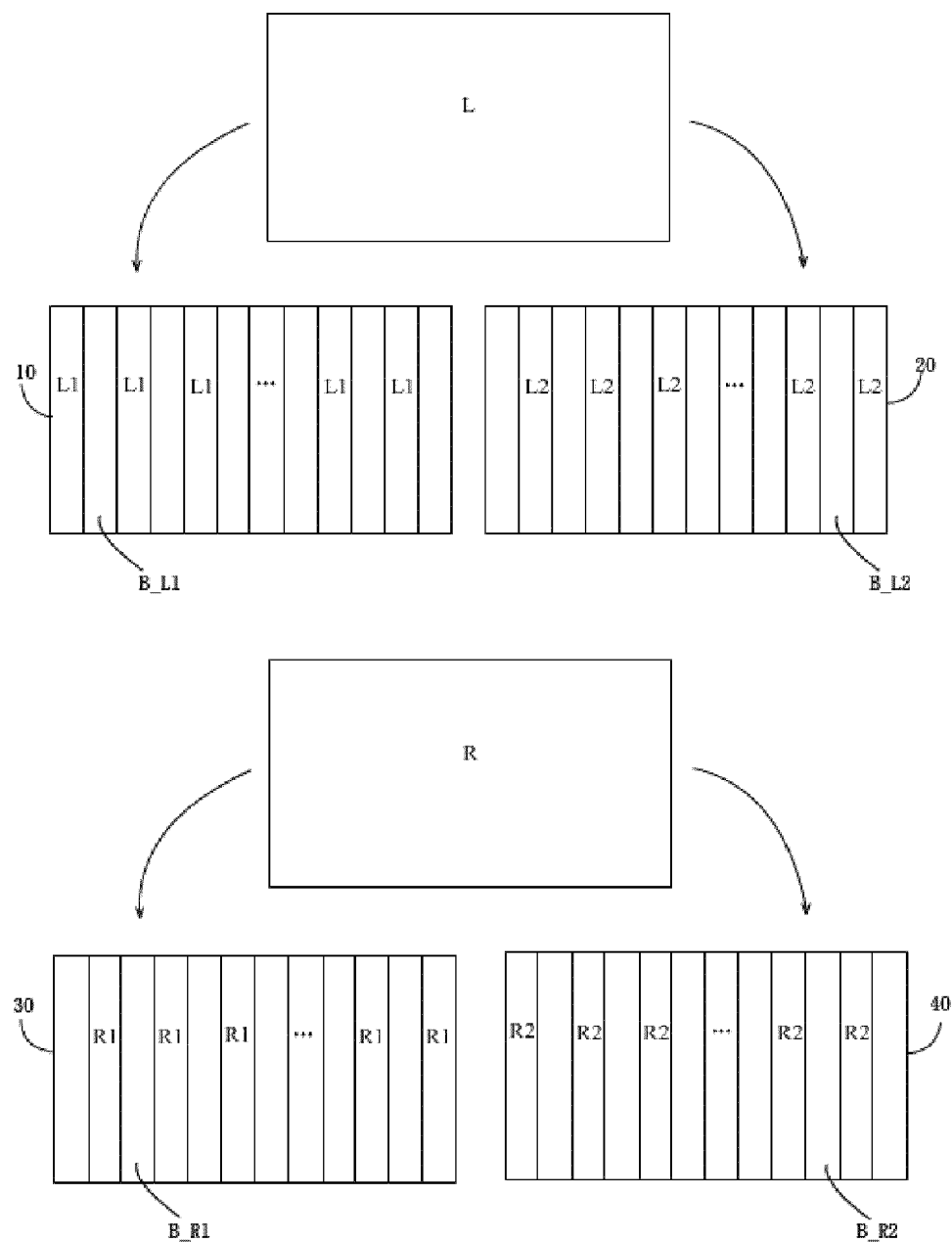
FIG. 8 illustrates an exemplary image display mechanism consistent with the disclosed embodiments.

FIG. 8 shows an exemplary image display mechanism on liquid crystal display module 300 consistent with the disclosed embodiments. As shown in FIG. 8, a left image L is displayed on liquid crystal display module 300 by displaying two images, a first left image 10 and a second left image 20, each may contain half of image elements of the left image L, and each may be displayed at a different time. The first left image comprises a series of image elements L1, and each image element L1 is separated by a blank space B_L1. The other half of the left image, the second left image, comprises a series of image elements L2, and each image element L2 is separated by a blank space B_L2. That is, the complete left image is separated into a series of image elements L1 and a series of image elements L2, and separately displayed as first left image 10 and second left image 20. Further, the timing for displaying first left image 10 and second left image 20 may be configured such that the time difference between the moment displaying first left image 10 and the moment displaying second left image 20 is less than or equal to the maximum time for human vision persistence (i.e., persistence of vision). Thus, the viewer can view a complete left image even when the image is displayed separately in different time.

Similarly, a right image R is displayed on liquid crystal display module 300 by displaying a first right image 30 and a second right image 40 separately in a short period of time. First right image 30 comprises a series of image elements R1, each of which is separated by a blank space B_R1; and second right image 40 comprises a series of image elements R2, each of which is separated by a blank space B_R2.

To view a 3D image, the viewer's left eye needs to see the left image and the viewer's right eye needs to see the right image. By separately displaying two separate images of the left image and the right image, the viewer's left eye can see a complete left image, and the viewer's right eye can see a complete right image.

More particularly, in certain embodiments, the blank spaces in the various images are of the same length, i.e., B_L1, B_L2, B_R1, and B_R2 are the same. Further, image element L1 in first left image 10 may correspond to the same position of blank space B_R1, and image element R1 in first right image 30 may correspond to the same position of blank space B_L1. That is, first left image 10 and first right image 30 may be combined without losing information and displayed at a first display moment. Similarly, image element L2 in second left image 20 may correspond to the same position of blank space B_R2, and image element R2 in second right image 40 may correspond to the same position of blank space B_L2. That is, second left image 20 and second right image 40 may be combined without losing information and displayed at a second display moment.

Figure 9:
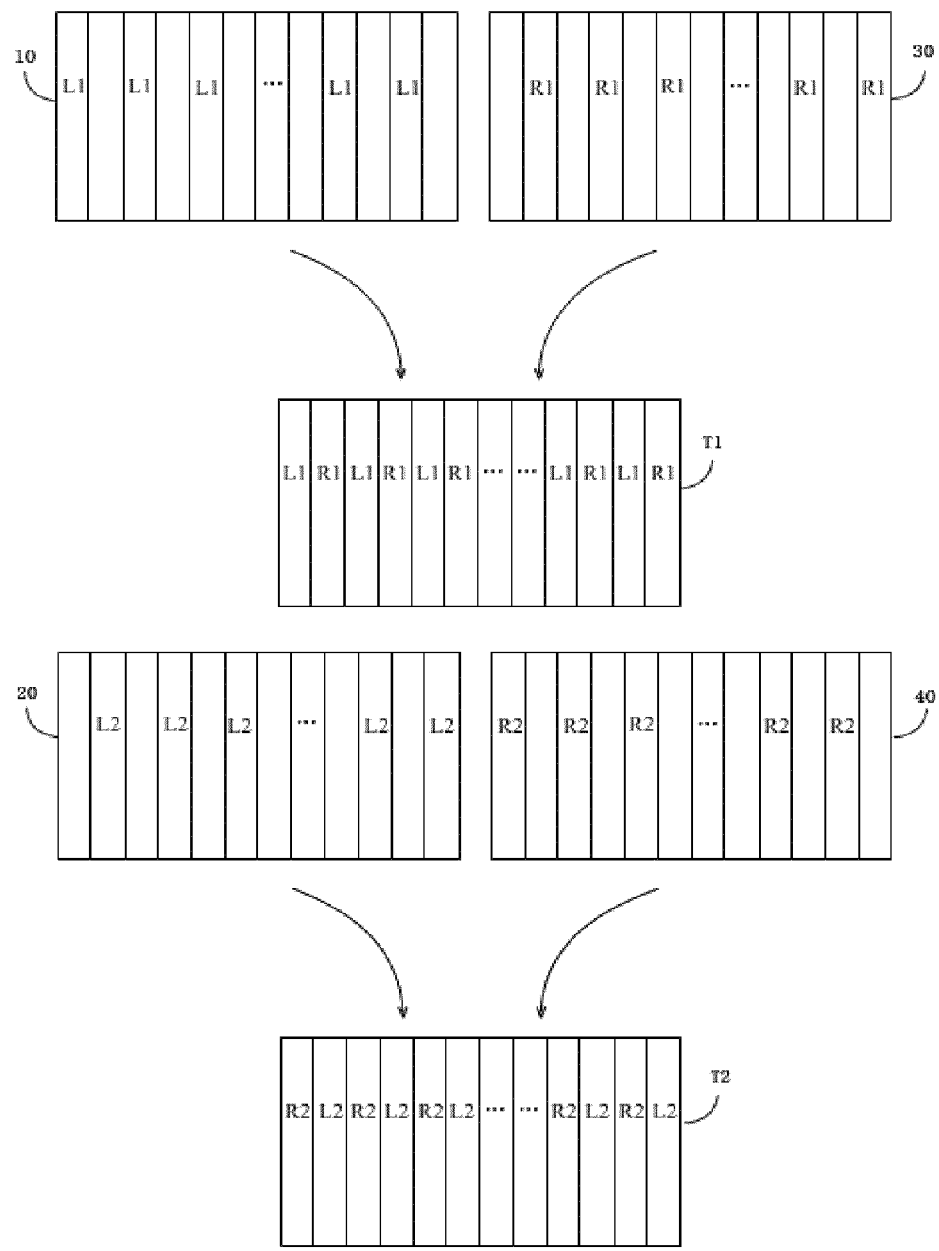
FIG. 9 illustrates an exemplary image display consistent with the disclosed embodiments.

As shown in FIG. 9, first left image 10 and first right image 30 are combined into a first image T1, with blank spaces B_L1 and B_R1 replaced by image elements R1 and L1, respectively. Also, second left image 20 and second right image 40 are combined into a second image T2, with blank spaces B_L2 and B_R2 replaced by image elements R2 and L2, respectively. Further, the combined first image T1 is displayed at the first display moment and the combined second image T2 is displayed at the second display moment.

The first display moment and the second display moment may be continuous in time, and the duration for the first display moment (i.e., the time duration for displaying the first image T1) and the duration for the second display moment (i.e., the time duration for displaying the second image T2) may have a same value. The total duration of the first display moment and the second display moment may be referred as a display period for displaying a high-resolution 3D image, i.e., the time period for displaying a complete 3D image by displaying separate images in different display moments. The display period may also include more than two display moments and/or more than two separate images, any appropriate number of display moments and/or separate images may be used. For example, if display module 300 has a refreshing rate of 120 Hz, 60 Hz may be used to display the first image T1 at the first display moment and the other 60 Hz may be used to display the second image T2 at the second display moment. Further, the first image T1 and the second image T2 may be displayed alternately during the 120 Hz period. Other time duration and/or display timing may also be used.

Figure 10:
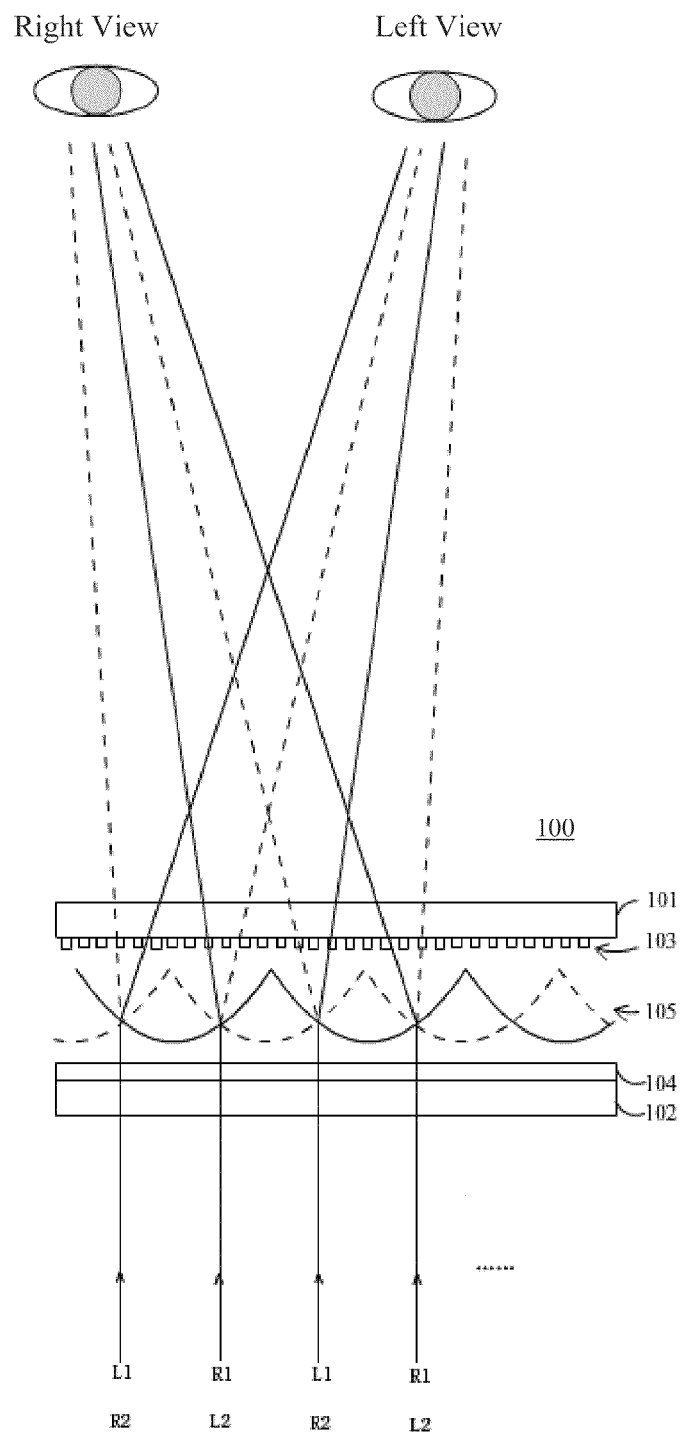
FIG. 10 illustrates an exemplary high-resolution 3D display system consistent with the disclosed embodiments.

FIG. 10 shows an exemplary high-resolution 3D display system. As shown in FIG. 10, at the first display moment (in solid lines), lens units 1052 of liquid crystal lens array 100 receive first combined image T1 and separate first left image L1 and first right image R1 into the left view and the right view, respectively. A single lens unit 1052 corresponds to a single image element L1 and a single image element R1, separated by center line O of the single lens unit 1052, as shown in solid lines. Thus, lights of image element L1 go to the left view, and lights of image element R1 go to the right view.

Further, at the second display moment (in dotted lines), voltages applied on strip electrodes 1031 of first electrode layer 103 are shifted by a distance equal to the width of L1. Thus, lens units 1052 are also shifted by the distance of L1 (or a half of a total width of one image element of first left image 10 and one neighboring image element of first right image). Second image T2 is displayed at the second display moment after lens units 1052 shifted horizontally. A shifted single lens unit 1052 now corresponds to image element L2 and image element R2, separated by center line O of the shifted single lens unit 1052, as shown in dotted lines. Thus, lights of image element L2 go to the left view, and lights of image element R2 go to the right view.

Thus, during the time period of the first display moment and the second display moment, the viewer's left eye from the left view can see a complete left image, and the viewer's right eye from the right view can see a complete right image. That is, neither of the left image nor the right image suffers a reduction in resolution, and the viewer can see the image for a full-resolution view. Thus, there is no loss of resolution for 3D display. Further, although the left image and the right image are separated into two images in the above example, any number of separated images may be used, and the shifting distance of lens unit 1052 may be a width of an image element from the left image or the right image. Further, L1, L2, R1, and R2 may also have different values without departing the principles of the disclosed embodiments.

Figure 11:
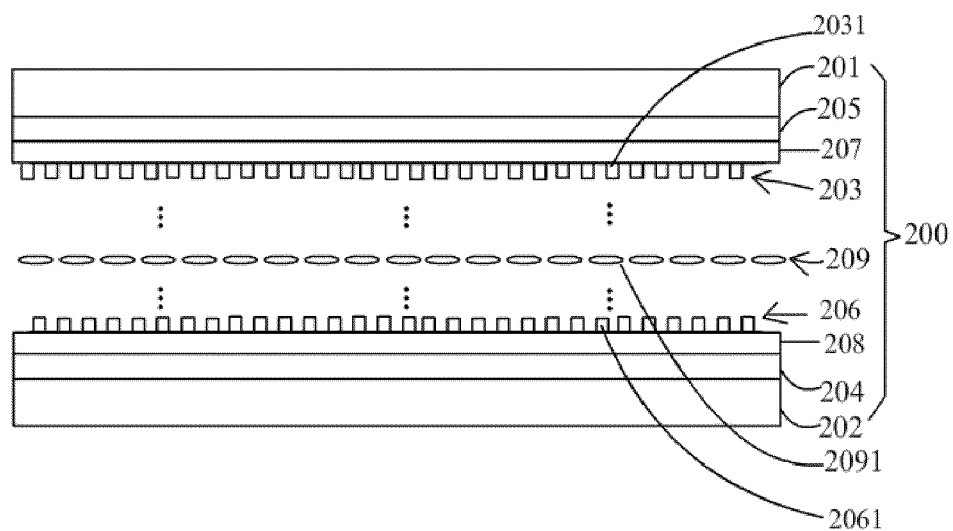
FIG. 11 illustrates another exemplary of liquid crystal lens array for 3D display consistent with the disclosed embodiments.

FIG. 11 shows another exemplary of liquid crystal lens array 200 for 3D display consistent with the disclosed embodiments. As shown in FIG. 11, liquid crystal lens array 200 includes a first substrate 201, a second substrate 202, a first electrode layer 203, a second electrode layer 204, a third electrode layer 205, a fourth electrode layer 206, a first insulation layer 207, a second insulation layer 208, and a liquid crystal layer 209

First substrate 201 and/or second substrate 202 may be configured correspondingly and may be in a plate shape made from transparent materials such as glass, silicon, or synthetic resin. Third electrode layer 205 may be formed on the inside surface of first substrate 201 facing second substrate 202. First insulation layer 207 may be formed on the surface of third electrode layer 205 and may be made from transparent insulation materials.

First electrode layer 203 may be formed on the surface of first insulation layer 207. First electrode layer 203 may include a plurality of strip-shaped electrodes, and each of the plurality of electrodes 2031 may be arranged in parallel with a certain distance between each other. The distance may be same for each of neighboring two strip electrodes or may be different.

Second electrode layer 204 may be formed on the inside surface of second substrate 202 facing first substrate 201, and corresponding to first electrode layer 203. Second insulation layer 208 may be formed on the surface of second electrode layer 204. Further, second insulation layer 208 may be made with transparent insulation materials and also correspond to first insulation layer 207.

Fourth electrode layer 206 may be formed on the inside surface of second insulation layer 208, and may include a plurality of strip electrodes 2061. Each of the plurality of electrodes 2061 may be arranged in parallel with a certain distance between each other, and the distance may be same for each of neighboring two strip electrodes or may be different.

Figure 12A:
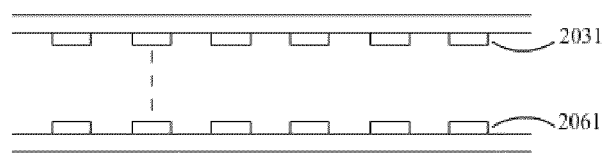
FIG. 12A illustrates an exemplary arrangement of electrodes consistent with the disclosed embodiments.
Figure 12B:
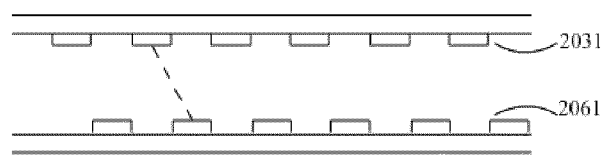
FIG. 12B illustrates an exemplary arrangement of electrodes consistent with the disclosed embodiments.

The plurality of strip electrodes 2061 may be arranged corresponding to the plurality of strip electrodes 2031. FIGS. 12A and 12B show exemplary arrangements of strip electrodes 2031 and strip electrodes 2061. As shown in FIG. 12A, strip electrodes 2031 and strip electrodes 2061 are arranged coincident with each other vertically. On the other hand, as shown in FIG. 12B, strip electrodes 2031 and strip electrodes 2061 are arranged with a horizontal offset. The offset may be predetermined according to certain criteria. Other arrangements, however, may also be used. Further, first electrode layer 203, second electrode layer 204, third electrode layer 205, and fourth electrode layer 206 may be made of transparent materials, such as Indium Tin Oxides (ITO), Indium Zinc Oxide (IZO), or a-Indium Tin Oxides (a-ITO).

Further, returning to FIG. 11, liquid crystal layer 209 may be placed and sealed between first substrate 201 and second substrate 202. For example, UV (Ultraviolet Rays) light curing adhesive may be used to seal the edges of the space between first substrate 201 and second substrate 202 such that a sealed space may be formed between first substrate 201 and second substrate 202. The sealed space may then be used to contain liquid crystal layer 209. Further, liquid crystal layer 209 may contain many liquid crystal molecules 2091. A liquid crystal molecule 2091 may be in a rod shape and have a long axis along the rod direction.

To display 2D images, a zero voltage difference is maintained among first electrode layer 203, second electrode layer 204, third electrode layer 205, and fourth electrode layer 206. The long axis of liquid crystal molecules 2091 of liquid crystal layer 209 above is in parallel to first substrate 201 and second substrate 202. When lights enter liquid crystal lens array 200 through second substrate 202 in a perpendicular direction, because polarizer placed outside liquid crystal lens array 200 can be configured in a polarization direction parallel to the long axis direction of liquid crystal molecules 2091. The lights then pass sequentially through second substrate 202, second electrode layer 204, second insulation layer 208, fourth electrode layer 206, liquid crystal layer 209, first electrode layer 203, first insulation layer 207, third electrode layer 205, and first substrate 201 to reach a viewer in front of liquid crystal lens array 200. Thus the viewer will see 2D images.

To display 3D images, driving voltage 500 may be controlled to provide a fixed voltage on second electrode layer 204, and to provide each strip electrode 2031 of first electrode layer 203 with un-identical voltages, while providing neighboring strip electrodes 2031 with different voltages. Further, third electrode layer 205 may be grounded and no voltages may be applied on fourth electrode layer 206. Similar to previous embodiments, a lens array may thus be formed and may be referred as a first lens array.

Further, a fixed voltage may be applied on third electrode layer 205, and to provide each strip electrode 2061 of fourth electrode layer 206 with un-identical voltages. At the same time, second electrode layer 204 may be grounded and no voltages may be applied to first electrode layer 203. Similar to previous embodiments, a lens array may also be formed and may be referred as a second lens array.

Thus, liquid crystal lens array 200 may be configured as either the first lens array or the second lens array. Further, liquid crystal lens array 200 may be configured as the first lens array or the second lens array alternately. For example, to achieve a high-resolution when displaying 3D images, voltage values may be alternately applied to strip electrodes 2031 of first electrodes layer 203 and strip electrodes 2061 of fourth electrode layer 206, such that a lens shift along the direction from center line O to edge line E may be created.

Figure 13:
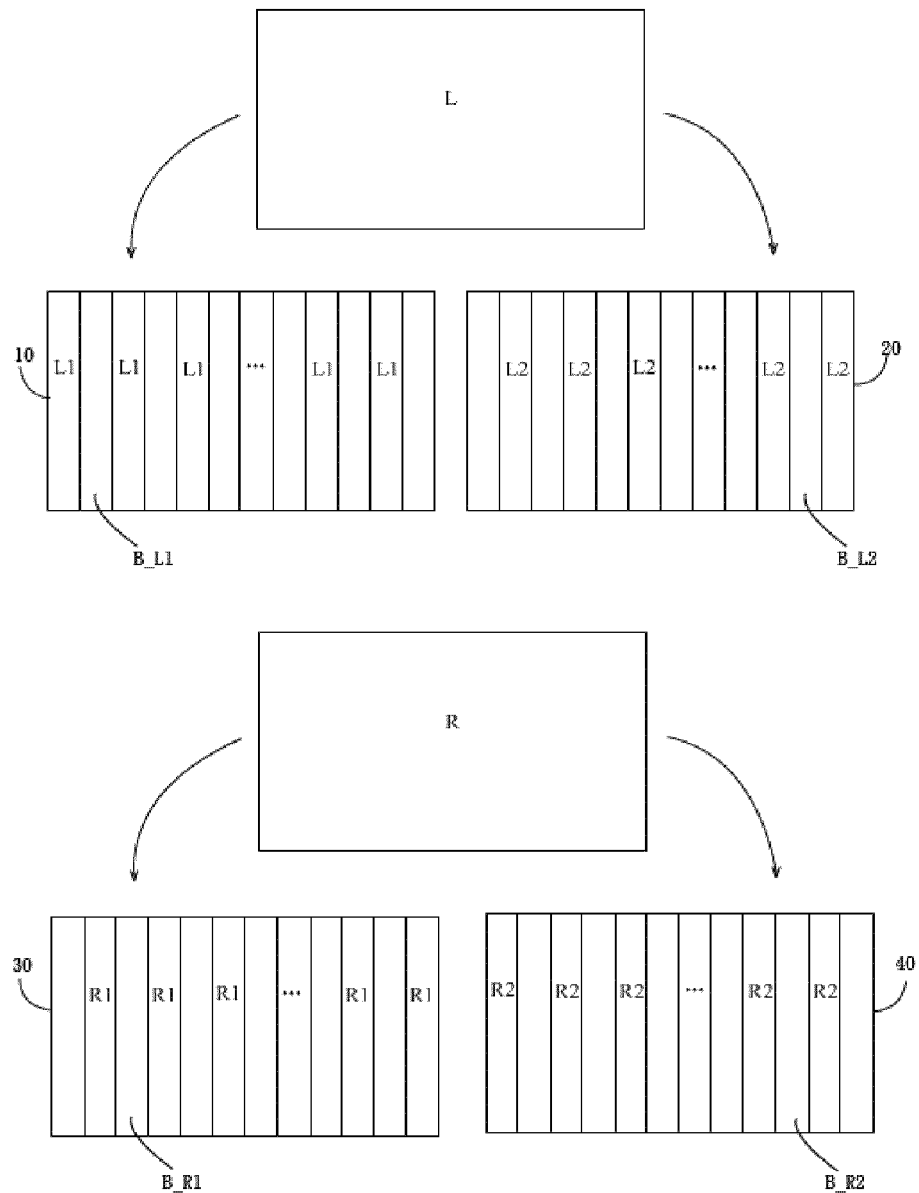
FIG. 13 shows an exemplary image display mechanism consistent with the disclosed embodiments.

FIG. 13 shows an exemplary image display mechanism on liquid crystal display module 300 similar to FIG. 8. At a first display moment, a periodical voltage values may be applied to the plurality of electrodes 2031 of first electrode layer 203 and a fixed voltage may be applied to second electrode layer 204, while third electrode layer 205 may be grounded and no voltages may be applied on fourth electrode layer 206. A first lens array for the first display moment is thus formed.

Further, at a second display moment, a periodical voltage values may be applied to the plurality of electrodes 2061 of fourth electrode layer 206 and a fixed voltage may be applied to third electrode layer 205, while second electrode layer 204 may be grounded and no voltages may be applied on first electrode layer 203. A second lens array for the second display moment is thus formed.

As shown in FIG. 13, image element L1 in first left image 10 and image element R1 in first right image 30 may be displayed at the first display moment by the first lens array, while image element L2 in second left image 20 and image element R2 in second right image 40 may be displayed at the second display moment by the second lens array.

Figure 14:
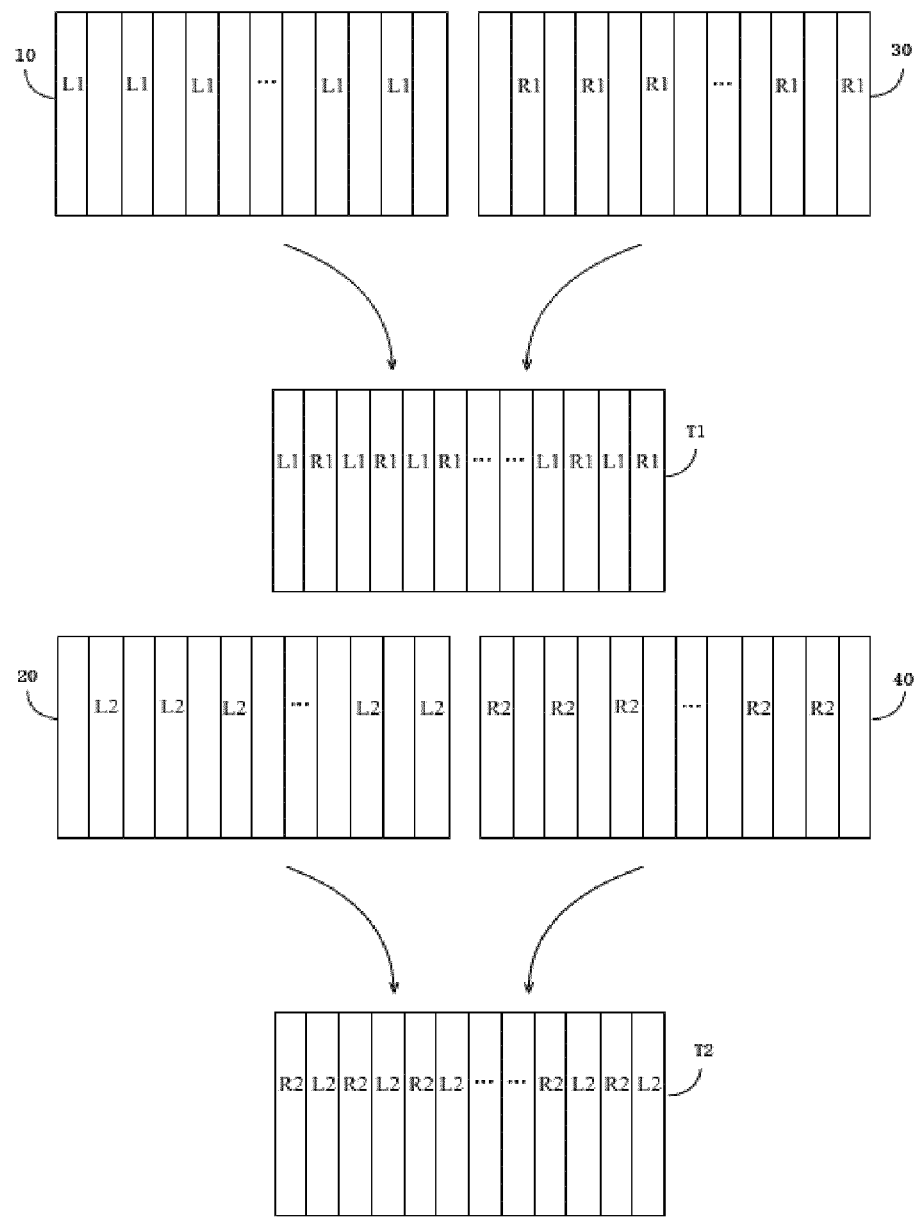
FIG. 14 shows an exemplary image display mechanism consistent with the disclosed embodiments.

As shown in FIG. 14, first left image 10 and first right image 30 are combined into a first image T1, and second left image 20 and second right image 40 are combined into a second image T2, similar to FIG. 9. Further, the combined first image T1 is displayed at a first display moment and the combined second image T2 is displayed at a second display moment.

Figure 15:
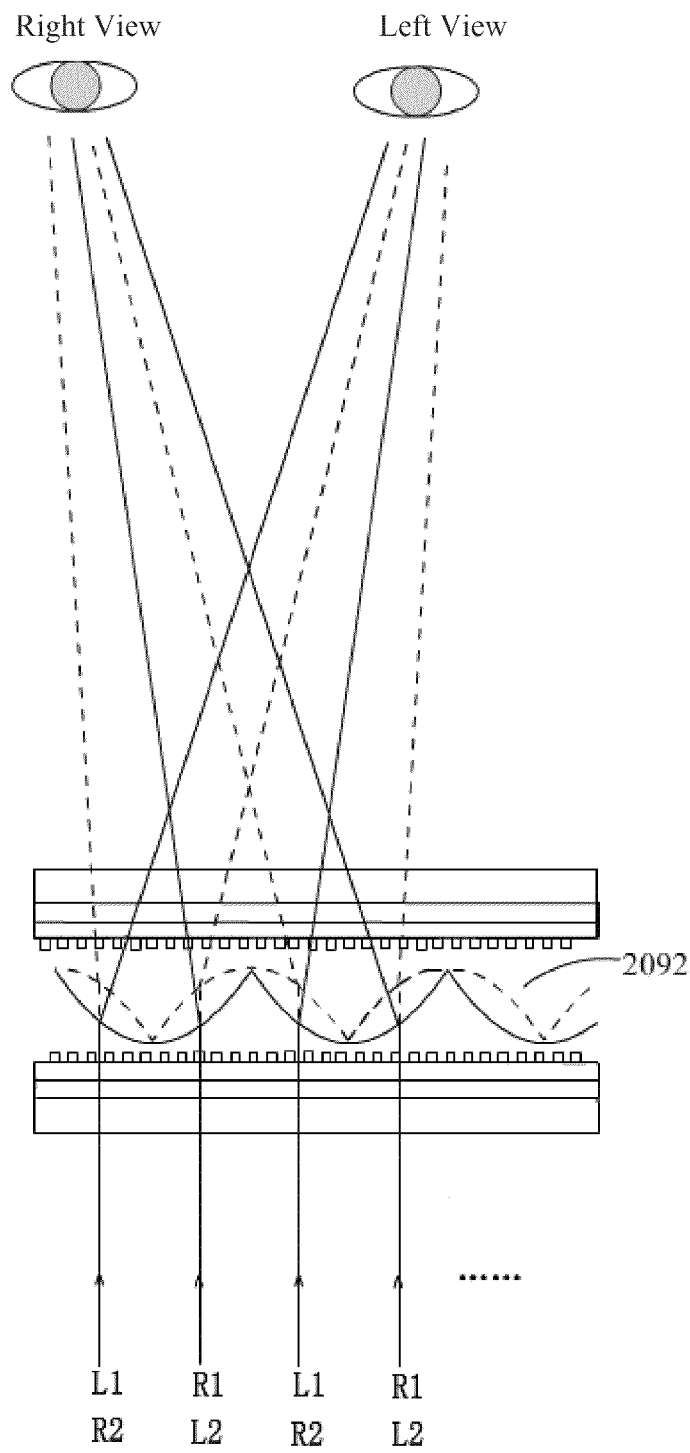
FIG. 15 shows another exemplary high-resolution 3D display system consistent with the disclosed embodiments.

FIG. 15 shows another exemplary high-resolution 3D display system. As shown in FIG. 15, at the first moment, the first lens array receives first combined image T1 and separates first left image L1 and first right image R1 into the left view and the right view, respectively. A single lens unit of the first lens array corresponds to one image element L1 and one image element R1, separated by center line O of the single lens unit, as shown in solid lines. Thus, lights of image element L1 go to the left view, and lights of image element R1 go to the right view.

Further, at the second moment, the second lens array may be provided, replacing the first lens array, and may be considered as a shifted first lens array by a distance equivalent to the width of L1. Thus, each lens unit of the second lens array is also considered as being shifted by the distance of L1 (or a half of a total width of one image element of first left image 10 and one image element of first right image 30). A single lens unit of the second lens array corresponds to one image element L2 and one image element R2, as shown in dotted lines. Thus, lights of image element L2 go to the left view, and lights of image element R2 go to the right view.

Thus, during the time period of the first moment and the second moment, the viewer's left eye from the left view can also see a complete left image, and the viewer's right eye from the right view can see a complete right image. That is, neither of the left image nor the right image has a reduction in resolution, and the viewer can see the image for the full-resolution view.

Figure 16:
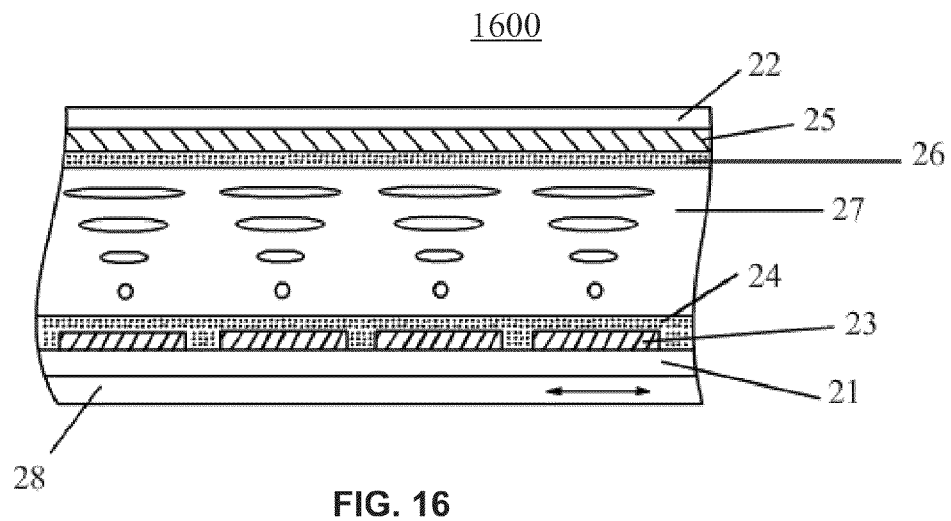
FIG. 16 shows an exemplary slit grating device consistent with the disclosed embodiments.

FIG. 16 shows an exemplary slit grating device that may be configured to replace liquid crystal lens array 100 to achieve full-resolution 3D display. As shown in FIG. 16, slit grating 1600 includes a first transparent substrate 21, a second transparent substrate 22, a plurality of strip electrodes 23, a first alignment layer 24, a common electrode 25, a second alignment 26, a liquid crystal layer 27, and a polarizer 28. First transparent substrate 21 may be arranged in parallel to second transparent substrate 22 with a predetermined distance. The plurality of strip electrodes 23 may be arranged in parallel to each other and may be built or arranged on a surface of transparent substrate 21. First alignment layer 24 covers the plurality of strip electrodes 23 and first substrate 21.

Common electrode 25 may be a plane-shaped smooth electrode and may be built on a surface of second transparent substrate 22, and second alignment layer 26 covers common electrode 25 and second transparent substrate 22. The alignment direction of alignment layer 24 is perpendicular to the alignment direction of alignment layer 26. Further, liquid crystal layer 27 may include any appropriate type of liquid crystal and are positioned between alignment layer 24 and alignment layer 26.

Polarizer 28 is placed in between slit grating and display module 300 to ensure single direction linearly polarized lights entering slit grating 1600 from display module 300.

During operation, the plurality of driving voltages may be applied to common electrode 25 and plurality of strip electrodes 23. Electric fields may then be generated between common electrode 25 and the plurality of strip electrodes 23 such that liquid crystal 27 may rotate the direction of long axis of crystal molecules of liquid crystal 27. When the long axis of crystal molecules is rotated, entering lights may be blocked. On the other hand, when no electric field exists between common electrode 25 and the plurality of strip electrodes 23, entering lights can pass without being blocked. Further, because the plurality of strip electrodes 23 may be controlled individually or separately, a slit grating may be formed based on the plurality of strip electrodes 23. Further, at different time, different slit grating (e.g., different positions) may be formed based on the plurality of strip electrodes 23.

Figure 17:
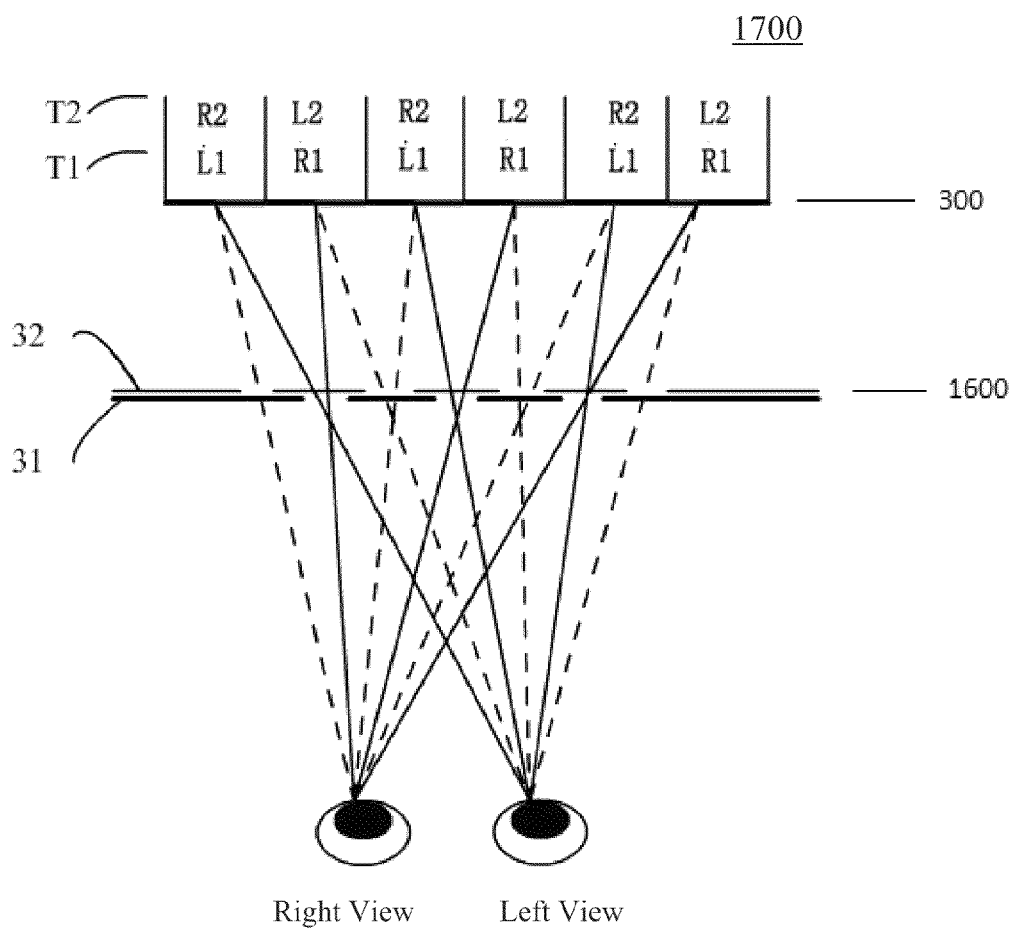
FIG. 17 shows an exemplary high-resolution 3D display system consistent with the disclosed embodiments.

FIG. 17 shows an exemplary display device 1700 based on slit grating 1600 consistent with the disclosed embodiments. As shown in FIG. 17, similar to previously described embodiments, slit grating 1600 may include a first slit grating 31 at a first moment and a second slit grating 32 at a second moment. Second slit grating 32 may be treated as a shifted first slit grating 31 in horizontal direction with a predetermined offset, such as a distance between two neighboring pixels or subpixels. Such shift may be achieved by shifting the various driving voltages applied to the plurality of strip electrodes 23.

Thus, at the first moment, first slit grating 31 receives first combined image T1 and separates first left image L1 and first right image R1 into the left view and the right view, respectively, as shown in solid lines. Thus, lights of image element L1 go to the left view, and lights of image element R1 go to the right view.

Further, at the second moment, second slit grating 32 may be provided, replacing first slit grating 31, and may be considered as a shifted first slit grating by a predetermined offset of, for example, the width of L1. Thus, lights of image element L2 go to the left view, and lights of image element R2 go to the right view, as shown in dotted lines.

Thus, during the time period of the first moment and the second moment, the viewer's left eye from the left view can also see a complete left image, and the viewer's right eye from the right view can see a complete right image. That is, neither of the left image nor the right image has a reduction in resolution, and the viewer can see the image for the full-resolution view.

What is claimed is:

1. A three-dimensional (3D) display system for displaying a 3D image including at least a first image and a second image, with a parallax between the first image and the second image, the 3D display system comprising:
   a display device configured to display at least two combined images of the 3D image in a single display period, wherein each of the two combined images includes a part of the first image and a part of the second image; and
   a liquid crystal lens array having a plurality of lens units configured to separate the part of the first image and the part of the second image in each of the two combined images into predetermined viewing directions, respectively, such that a complete first image and a complete second image are displayed without losing resolution.

2. The 3D display system according to claim 1, wherein:
   the display period includes a first display moment and a second display moment;
   the two combined images include a first combined image containing one half of the first image and one half of the second image; and a second combined image containing the other half of the first image and the other half of the second image;
   the first combined image is displayed at the first display moment; and
   the second combined image is displayed at the second display moment.

3. The 3D display system according to claim 2, wherein the liquid crystal lens array is further configured to:
   process the first combined image at the first display moment using the plurality of lens units; and
   process the second combined image at the second display moment using the plurality of lens units shifted by a predetermined distance.

4. The 3D display system according to claim 3, wherein the liquid crystal lens array includes:
   a first substrate;
   a plurality of first electrodes arranged on a surface of the first substrate in parallel with each other;
   a second substrate;
   a second electrode arranged on a surface of the second substrate and corresponding to the plurality of first electrodes; and
   a liquid crystal layer sealed between the first substrate and the second substrate and controlled by the first electrodes and the second electrode to form the plurality of lens units.

5. The 3D display system according to claim 4, wherein:
   the plurality of lens units are shifted by shifting various voltages applied to the plurality of first electrodes.

6. The 3D display system according to claim 4, wherein the liquid crystal lens array further includes:
   a third electrode built on a surface of the first substrate via a first insulation layer; and
   a plurality of fourth electrodes arranged in parallel and built on the surface of the second substrate via a second insulation layer,
   wherein the liquid crystal layer is controlled by the third electrode and the fourth electrodes to form another plurality of lens units.

7. The 3D display system according to claim 6, wherein:
   the liquid crystal lens array processes the first combined image at the first display moment using the plurality of lens units; and
   the liquid crystal lens array processes the second combined image at the second display moment using the another plurality of lens units.

8. The 3D display system according to claim 7, wherein:
   The plurality of lens units and the another plurality of lens units are arranged in a predetermined offset based on the combined images.

9. The 3D display system according to claim 2, wherein the display period is less than a maximum time period for human vision persistence.

10. A method for a three-dimensional (3D) display system, comprising:
    providing a 3D image including at least a first image and a second image, with a parallax between the first image and the second image;
    displaying at least two combined images of the 3D image in a single display period, wherein each of the two combined images includes a part of the first image and a part of the second image;
    applying a plurality of driving voltages to a liquid crystal lens array including a plurality of lens units to separate the part of the first image and the part of the second image in each of the two combined images into predetermined viewing directions, respectively, such that a complete first image and a complete second image are displayed without losing resolution.

11. The method according to claim 10, wherein the display period includes a first display moment and a second display moment, the method further including:
   combining one half of the first image and one half of the second image into a first combined image;
   combining the other half of the first image and the other half of the second image into a second combined image;
   displaying the first combined image at the first display moment; and
   displaying the second combined image at the second display moment.

12. The method according to claim 11, further including:
   processing the first combined image at the first display moment using the plurality of lens units; and
   processing the second combined image at the second display moment using the plurality of lens units shifted by a predetermined distance.

13. The method according to claim 12, further including:
   shifting the plurality of lens units by shifting various voltages applied to a plurality of first electrodes of the liquid crystal lens array and maintaining a same voltage on a second electrode of the liquid crystal lens array.

14. The method according to claim 12, further including:
   shifting the plurality of lens units by alternately using the plurality of lens units and another plurality of lens units of the liquid crystal lens array, the another plurality of lens units having a predetermined offset to the plurality of lens units.

15. The method according to claim 14, further including:
   processing the first combined image at the first display moment using the plurality of lens units; and
   processing the second combined image at the second display moment using the another plurality of lens units.

16. The method according to claim 10, wherein the display period is less than a maximum time period for human vision persistence.

17. A three-dimensional (3D) display system for displaying a 3D image including at least a first image and a second image, with a parallax between the first image and the second image, the 3D display system comprising:
   a display device configured to display at least two combined images of the 3D image in a single display period, wherein each of the two combined images includes a part of the first image and a part of the second image; and
   a slit grating device configured to alternately form a first slit grating and a second slit grating to separate the part of the first image and the part of the second image in each of the two combined images into different viewing directions, respectively, such that a complete first image and a complete second image are displayed without losing resolution.

18. The 3D display system according to claim 17, wherein:
   the display period includes a first display moment and a second display moment;
   the two combined images include a first combined image containing one half of the first image and one half of the second image; and a second combined image containing the other half of the first image and the other half of the second image;
   the first combined image is displayed at the first display moment; and
   the second combined image is displayed at the second display moment.

19. The 3D display system according to claim 18, wherein the slit grating device is further configured to:
   process the first combined image at the first display moment using the first slit grating; and
   process the second combined image at the second display moment using the second slit grating which is equivalent to the first slit grating shifted by a predetermined distance.

20. The 3D display system according to claim 19, wherein:
   the first slit grating is shifted by shifting various voltages applied to a plurality of electrodes of the slit grating device.

* * * * *